E. Regan.
Flanging Machine.
No. 3,966. Reissued May 10, 1870.
Fig; 3.
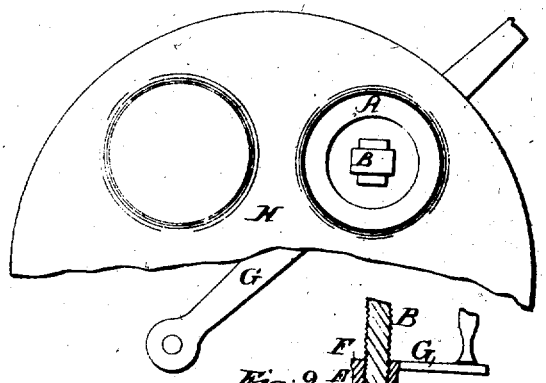
Fig; 2.
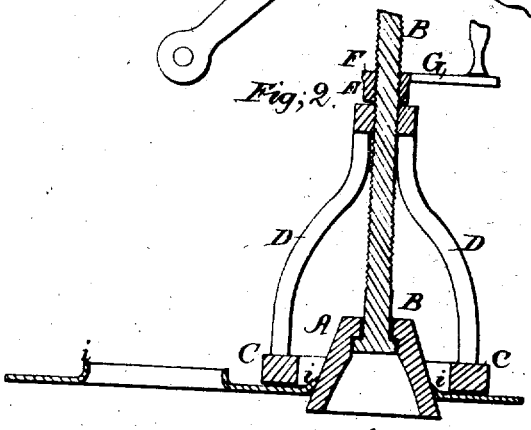
Fig; 1.
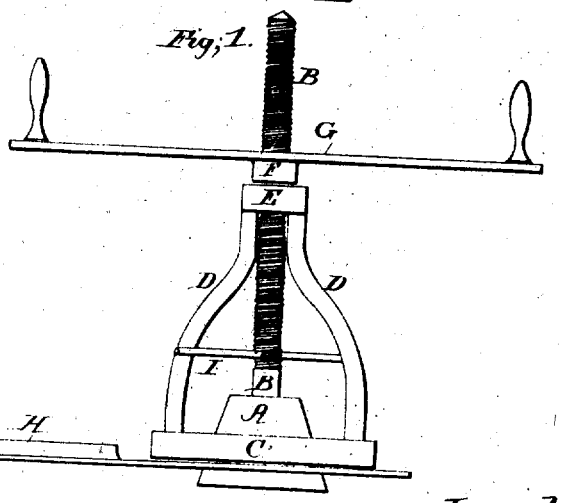
Witnesses;
O. F. Mayhew
D. H. Kneffler.
Inventor;
Edward Regan.

UNITED STATES PATENT OFFICE.

EDWARD REGAN, OF INDIANAPOLIS, INDIANA.

IMPROVED DEVICE FOR FLANGING FLUE-HOLES OF BOILER-HEADS.

Specification forming part of Letters Patent No. 99,707, dated February 8, 1870; Reissue No. 3,966, dated May 10, 1870.

*To all whom it may concern:*

Be it known that I, EDWARD REGAN, of Indianapolis, county of Marion, and State of Indiana, have invented a certain Device for Flanging the Flue-Holes in Boiler-Heads, of which the following is a specification.

My invention relates to a device by which to turn a flange to the flue-holes in boiler-heads; and it consists in a tapering die, combined with an annular counter-die and suitable connections by which the die may be drawn through the flue-holes, thereby turning out a sufficient flange to which to rivet the flues.

In the accompanying drawings, Figure 1 is an edge view of a boiler-head having the device embodying my invention applied thereto. Fig. 2 is a vertical longitudinal section of the same. Fig. 3 is a view of the inside of the boiler-head, showing the bottom of the cone-shaped die.

A is the die, which is a hollow cone-shaped casting, the upper end of which is pierced with a rectangular hole of proper size and form to receive the rectangular-shaped bottom end of the screw B. The interior of the die has recesses cut at right angles to the rectangular hole in its top end, forming shoulders to receive the projecting ends of the bottom of the screw when the latter is turned one-quarter around after being inserted in the hole in the top of the die. The object of constructing and arranging the bottom of the screw and the die in this manner is to provide for conveniently attaching the die to or disconnecting it from the screw, as required. The screw B extends upward through a bracket composed of a bottom ring, C, that rests upon the boiler-head, and three or more braces, D, upon the top of which is attached a smaller ring, E, as shown, which forms a friction-bearing for the nut F in the middle of lever G.

This flanging device is used in the following manner: The boiler-head H, having been pierced with suitable holes and heated to a workable temperature, is laid upon trestles or other supports, and is prevented from being turned in operating the device by inserting a pin through one of the flue-holes into the support below. The bracket, with the screw hanging therein by the nut F in lever G, is then set over the hole to be flanged and the die attached to the lower end of the screw from below the boiler-head. By turning the lever G the screw C and die B are drawn upward. The die forces up and forms the flange *i* around the hole in the boiler-head, as shown in Fig. 2. When the die is drawn through the hole the device is free from the head, and the latter may be returned to the fire, to be again heated, while in the meantime the screw may be run down preparatory to repeating the operation. The screw is prevented from turning in the bracket by a pin, I, inserted through the screw and resting against one of the braces D.

The bottom ring, C, should be substantially made and its internal diameter of the proper size to form the outside of the flange.

Different sizes of the device may be used to suit different-size holes; but I prefer to use bushing on the inside of ring C, thereby avoiding the expense of several different implements.

The advantage of this device for flanging the flue-holes in boiler-heads is that the flange may be more easily and rapidly formed, saving time and labor, and the holes and flanges are formed to a true circle, thereby making it easier to fit in the flues.

I claim as my invention—

1. An apparatus for flanging the flue-holes in boiler-heads, comprising a die, A, an annular counter or ring, C, surrounding said die, and a device for drawing the said die through the said counter, having its bearing on the latter, substantially as herein set forth.

2. The flanging device composed of the die A, screw B, bracket C D E, and nut and lever F and G, constructed, arranged, and operating substantially as and for the purpose set forth.

In testimony of which invention I hereunto set my hand.

EDWARD REGAN.

Witnesses:

GEO. H. KNIGHT,

JAMES H. LAYMAN.